(12) United States Patent
Uchida

(10) Patent No.: US 10,402,550 B2
(45) Date of Patent: Sep. 3, 2019

(54) AUTHENTICATING APPARATUS FOR EXECUTING USER AUTHENTICATION

(71) Applicant: KYOCERA Document Solutions Inc., Osaka (JP)

(72) Inventor: Yuzuru Uchida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 74 days.

(21) Appl. No.: 15/715,890

(22) Filed: Sep. 26, 2017

(65) Prior Publication Data

US 2018/0089404 A1    Mar. 29, 2018

(30) Foreign Application Priority Data

Sep. 26, 2016  (JP) ................................ 2016-186807

(51) Int. Cl.
*G06F 21/00* (2013.01)
*G06F 21/31* (2013.01)
*H04L 29/06* (2006.01)
*G06F 3/01* (2006.01)
*G06F 3/0488* (2013.01)
*H04W 12/06* (2009.01)
(Continued)

(52) U.S. Cl.
CPC .............. *G06F 21/31* (2013.01); *G06F 3/016* (2013.01); *G06F 3/041* (2013.01); *G06F 3/0488* (2013.01); *G06F 3/04886* (2013.01); *H04L 63/083* (2013.01); *H04W 12/06* (2013.01); *H04W 88/02* (2013.01)

(58) Field of Classification Search
None
See application file for complete search history.

(56) References Cited

U.S. PATENT DOCUMENTS 8,539,503 B2 * 9/2013 Homma ............... H04N 19/159
709/219
9,038,166 B2 * 5/2015 Yi ........................... G06F 21/31
726/19
(Continued)

FOREIGN PATENT DOCUMENTS

JP    2004-326525 A    11/2004
JP    2009-223470 A    10/2009

*Primary Examiner* — Maung T Lwin
(74) *Attorney, Agent, or Firm* — Hawaii Patent Services; Nathaniel K. Fedde; Kenton N. Fedde

(57) ABSTRACT

Provided is an authenticating apparatus that by a simple method improves security when entering a password. The authentication-processing unit executes user authentication by comparing an entered password that is entered with a preset set password. The input-receiving unit receives dummy keys while the entered password is entered that are not compared with the set password. The dummy-input-notification unit notifies using vibration of dummy key input timing and the number of times input is required. The authentication-processing unit, together with comparing the entered password with the set password, compares the number of times dummy keys are inputted with the number of times input is required. When the entered password and the set password match, and the number of times dummy keys are inputted and the number of times input is required match, authentication is determined to be successful.

8 Claims, 5 Drawing Sheets

(51) Int. Cl.
*G06F 3/041*  (2006.01)
*H04W 88/02* (2009.01)

(56) References Cited

U.S. PATENT DOCUMENTS

| | | | |
|---|---|---|---|
| 2004/0225880 A1* | 11/2004 | Mizrah | G06F 21/46 713/155 |
| 2007/0180255 A1* | 8/2007 | Hanada | G06F 21/31 713/176 |
| 2007/0198847 A1* | 8/2007 | Watari | G06F 21/36 713/184 |
| 2008/0091605 A1* | 4/2008 | Hughes | G06F 21/31 705/51 |
| 2009/0212980 A1* | 8/2009 | Hisada | G06F 3/0236 341/28 |
| 2009/0259588 A1* | 10/2009 | Lindsay | G06F 21/31 705/40 |
| 2014/0298432 A1* | 10/2014 | Brown | H04L 63/083 726/6 |

* cited by examiner

AUTHENTICATING APPARATUS FOR EXECUTING USER AUTHENTICATION

INCORPORATION BY REFERENCE

This application is based on and claims the benefit of priority from Japanese Patent Application No. 2016-186807 filed on Sep. 26, 2016, the contents of which are hereby incorporated by reference.

BACKGROUND

The present disclosure relates to an authenticating apparatus for executing user authentication by comparing an entered password that is entered and a set password that is set beforehand.

Various kinds of security technology are proposed that together with taking into consideration the operability of a person entering a password, also protects the password from being seen by a third party while the password is being entered. In typical technology, it becomes possible to omit entry of the password, and when entry of the password is omitted, the confidential information is represented by turned characters such as asterisks "*", and when the correct password is entered, it is visually displayed, including the confidential information. Moreover, in other typical technology, entered characters can be visually displayed in a password-entry field until a confirmation key is operated, and at the stage when the confirmation key is operated, the entered characters can be re-displayed using turned characters such as asterisks "*" or the like so as not to be visible.

SUMMARY

The authenticating apparatus according to the present disclosure includes an authentication-processing unit, an input-receiving unit, and a dummy-input-notification unit. The authentication-processing unit executes user authentication by comparing an entered password that is entered with a preset set password. The input-receiving unit receives dummy keys while the entered password is being entered that are not compared with the set password. The dummy-input-notification unit uses vibration to perform notification of input timing of dummy keys and the number of times input is required. The authentication-processing unit, together with comparing the entered password with the set password, compares the number of times dummy keys are inputted with the number of times input is required. When the entered password and the set password match, and the number of times dummy keys are inputted and the number of times input is required match, authentication is determined to be successful. When the entered password and the set password do not match and/or the number of times dummy keys are inputted and the number of times input is required do not match, authentication is determined to be failure.

DETAILED DESCRIPTION

In the following, embodiments of the present disclosure will be explained in detail with reference to the drawings. In the embodiment described below, the same reference numbers will be used for configuration that illustrates the same function.

Figure 1:
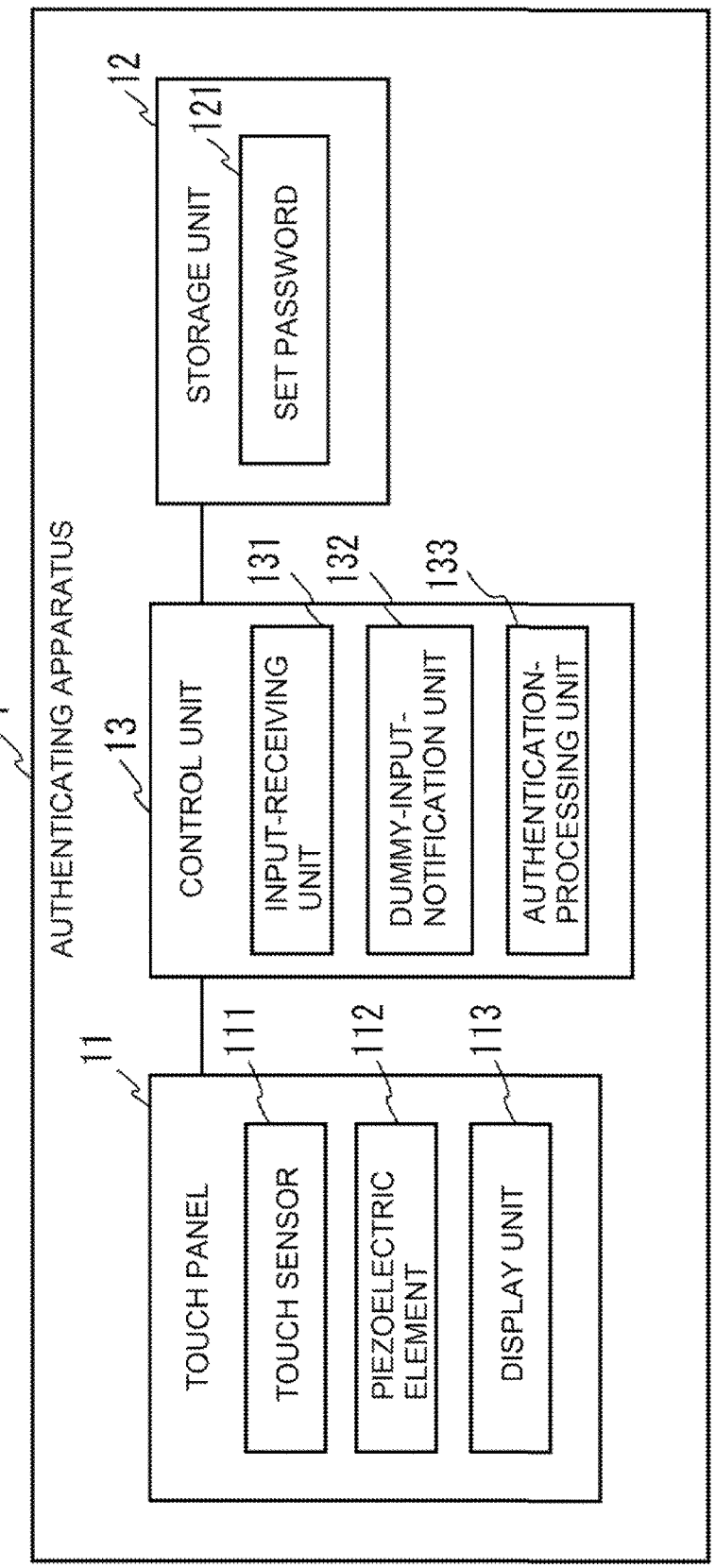
FIG. 1 is a functional block diagram that illustrates an overview of the configuration of an authenticating apparatus of an embodiment according to the present disclosure.

Referring to FIG. 1, the authenticating apparatus 1 is an authenticating apparatus for executing user authentication by comparing an entered password that is entered and a set password 121 that is set beforehand. The authenticating apparatus 1 includes a touch panel 11, a storage unit 12, and a control unit 13. The authenticating apparatus 1 may be mounted in an image-forming apparatus, portable telephone, a smartphone, a tablet terminal, automatic teller machine, and the like.

The touch panel 11 is such that a transparent sheet-like touch sensor 111 is provided on the display surface of a display unit 113 that displays various operation keys. The touch panel 11 detects touch (pressure input) by a finger or the like of a person that enters the entered password using the touch sensor 111, and outputs a signal that corresponds to the position where the touch is detected. In this way, the touch panel 11 functions as an input unit for receiving touch operations of operation keys that are displayed on the display unit 113. As the touch sensor 111 a resistive-membrane type sensor, capacitance method type sensor and the like can be used.

Moreover, piezoelectric elements 112 that function as a vibration-generation unit are applied to the touch sensor 111. The piezoelectric elements 112 are driven and controlled by a dummy-input-notification unit 132 (described later), and causes the touch sensor 111 to vibrate. In this way, the piezoelectric elements 112 cause the operation surface that is touch operated by the person entering a password to vibrate, and notifies the person entering a password of the input timing and number of input requests. The vibration-generation unit is not limited to piezoelectric elements 112, and may be some other element as long as vibration can be transmitted to the person entering a password. For example, instead of the piezoelectric elements 112, a vibration motor that causes the operation surface to vibrate may be provided on the touch panel 11.

The storage unit 12 is a storage unit such as a semiconductor memory, hard disk drive (HDD) and the like, and stores a set password 121 that is set beforehand by the person that enters a password. The set password 121 is a password for comparison with an entered password that is entered during user authentication. A set password 121 may be registered for each user. The storage unit 12 may respectively correlate the set password 121 for each user, and store a user ID and the like as user information for identifying each user.

The control unit 13 is connected to the touch panel 11 and the storage unit 12, respectively. The control unit 13 is an information-processing unit that includes read-only memory (ROM), random access memory (RAM), a microcomputer and the like. The ROM stores a control program for performing operation control of the authenticating apparatus 1. The control unit 13 reads the control program that is stored in the ROM, and by expanding that control program in the RAM, performs overall control of the apparatus.

Moreover, the control unit 13 functions as an input-receiving unit 131, a dummy-input-notification unit 132 and an authentication-processing unit 133.

Figure 2:
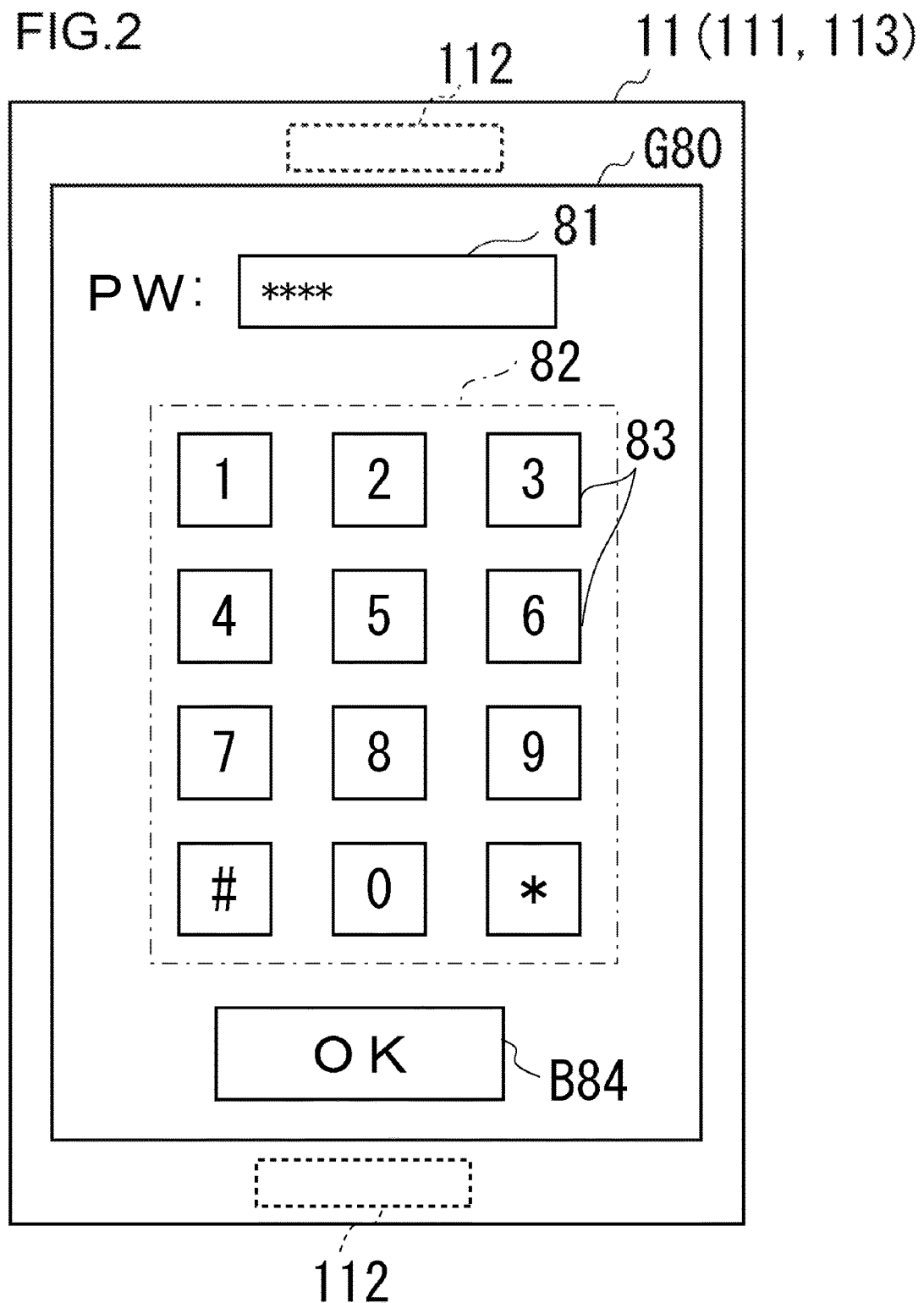
FIG. 2 illustrates an example of a password-entry screen that is displayed on the touch panel that is illustrated in FIG. 1.

The input-receiving unit 131 has a function for receiving an entered password that is entered via a password-entry screen G80 that is illustrated in FIG. 2, and dummy keys that are not compared with the set password 121 when entering the entered password. The entered password is a password that is entered in order for comparison with the set password 121. The dummy keys are keys that are entered using suitable operation keys 83 regardless of the entered password, and are not compared with the set password. The dummy keys are keys that are entered as a dummy in order to hide the entered password from a third party attempting to see the input operation by the person entering a password.

The password-entry screen G80 is displayed on the touch panel 11 in a situation in which user authentication is necessary. A password-entry field 81, a key-input unit 82 and an OK button B84 are provided on the password-entry screen G80. The entered password and dummy keys are entered in the password-entry field 81. The key-input unit 82 includes operation keys 83 such as a ten-key, keyboard and the like that are used for entering the entered password and dummy keys. Both the entered password and the dummy keys that are entered in the password-entry field 81 and that instruct execution of authentication with the OK button B84 are displayed using turned characters such as an asterisks "*".

When the password-entry screen G80 is displayed, the dummy-input-notification unit 132 determines the input timing of the dummy keys and the number of times input is required, and causes the piezoelectric elements 112 to vibrate the operation screen (touch sensor 111) of the touch panel 11. In this way, the dummy-input-notification unit 132 has the function for notifying the person that enters the password of the input timing and number of times input is required. By performing notification by using vibration in this way, it is possible to notify the person that enters the password of the input timing of the dummy keys and the number of time input is required without notifying a third party.

When entry of the ($\alpha$−1)th character of the entered password is received by the input-receiving unit 131, the dummy-input-notification unit 132 may perform notification of the input timing and number of time input is required. This is performed by vibrating the operation surface of the touch panel 11 at the same time that next touch operation of the touch panel 11 is detected. As a result, the dummy-input-notification unit 132 causes the operation surface of the touch panel 11 to vibrate at the stage in which a touch operation is detected without waiting for the input-receiving unit 131 to receive the $\alpha$th character of the entered password, so is able to definitely transmit the vibration to the person entering the password.

The input timing indicates the timing at which the $\alpha$th character of the entered password is entered. This means that dummy keys must be entered immediately after the $\alpha$th character. Here, $\alpha$ is determined by the dummy-input-notification unit 132 at random from among the number of characters of the set password 121. The number of times that input is required indicates the number of times that a dummy key will be entered, and is determined at random from among a specified range of number of times taking into consideration operability (for example, 1 to 5 times). For example, when $\alpha$ is 2, and the number of times input is required is 2 times, the dummy-input-notification unit 132 causes the operation surface of the touch panel 11 to vibrate two times (brr-brr) when the 2nd character of the entered password is entered.

The authentication-processing unit 133 has a function of executing user authentication by comparing the entered password that is received by the input-receiving unit 131 with the set password 121, together with comparing the number of times that dummy keys are entered while entering the entered password with the number of times input is required. A dummy key is a password that is entered using suitable operation keys 83, and is compared with the number of times input is required that is notified by the dummy-input-notification unit 132 as to whether or not there is a match.

When the entered password matches the set password 121, and the number of times dummy keys are entered matches the number of times input is required, the authentication-processing unit 133 determines that authentication is successful, and for example, executes login processing and the like. When the entered password does not match the set password 121, or the number of times dummy keys are entered does not match the number of times input is required, or when at least one does not match, the authentication-processing unit 133 determines that authentication is failure, and prompts the user to re-enter the entered password and dummy keys.

Figure 3:
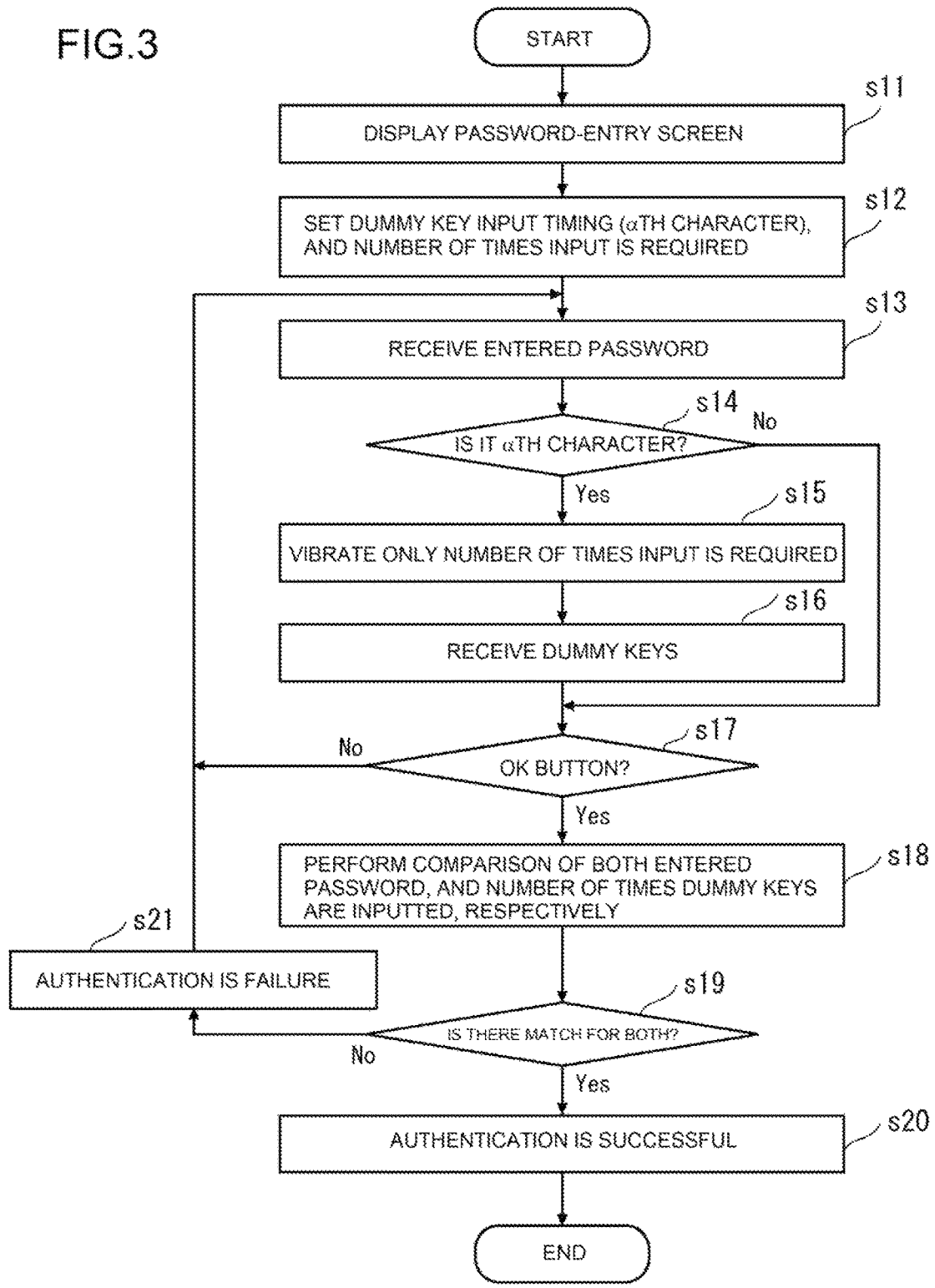
FIG. 3 is a flowchart illustrating the flow of the authentication process by the authenticating apparatus that is illustrated in FIG. 1.

Next, the flow of the authentication process by the authenticating apparatus 1 will be explained with reference to FIG. 3.

The control unit 13 causes the touch panel 11 to display the password-entry screen G80 (step S11), and functions as a dummy-input-notification unit 132 and determines the input timing for inputting dummy keys ($\alpha$th character of the entered password) and the number of times input is required (step S12). By randomly determining the dummy key input timing and the number of times input is required, the dummy-input-notification unit 132 can increase the effect of hiding the entered password. By setting the input timing and/or the number of times input is required to fixed values, the dummy-input-notification unit 132 can increase operability for the person entering the password.

Continuing, by the person entering the password using the operation keys 83 and entering the entered password, the input-receiving unit 131 receives the entered password (step S13).

Next, the dummy-input notification unit 132 determines whether or not the entered password that is received by the input-receiving unit 131 is the $\alpha$th character that is the input timing for inputting dummy keys (step S14). When the entered character is the $\alpha$th character (step S14: YES), the dummy-input-notification unit 132 causes the piezoelectric elements 112 to vibrate the operation surface of the touch panel 11 the set number of times input is required (step S15). As a result, the person that is entering the password enters the $\alpha$th character by touching the touch panel 11 with a finger, the touch panel 11 vibrates the number of times that input is required, so the person knows that the next character entered is not the ($\alpha$+1)th character of the entered password, but that dummy keys for the number of times input is required must be entered.

Next, when the person entering the password touch operates suitable operation keys 83 the number of times that input is required, the input-receiving unit 131 receives the input for the number of times that input is required as dummy keys (step S16).

Next, the input-receiving unit 131 determines whether or not the OK button B84 that instructs execution of the authentication process is operated (step S17). When the OK button B84 has not been operated (step S17: NO), processing returns to the process of step S13 for receiving the entered password. Moreover, even when the entered password received by the input-receiving unit 131 is not the αth character (step S14: NO), it is determined whether or not the OK button 84 is operated (step S17), and the processing from step S13 to step S17 is repeated until the OK button B84 is repeated.

Figure 4:
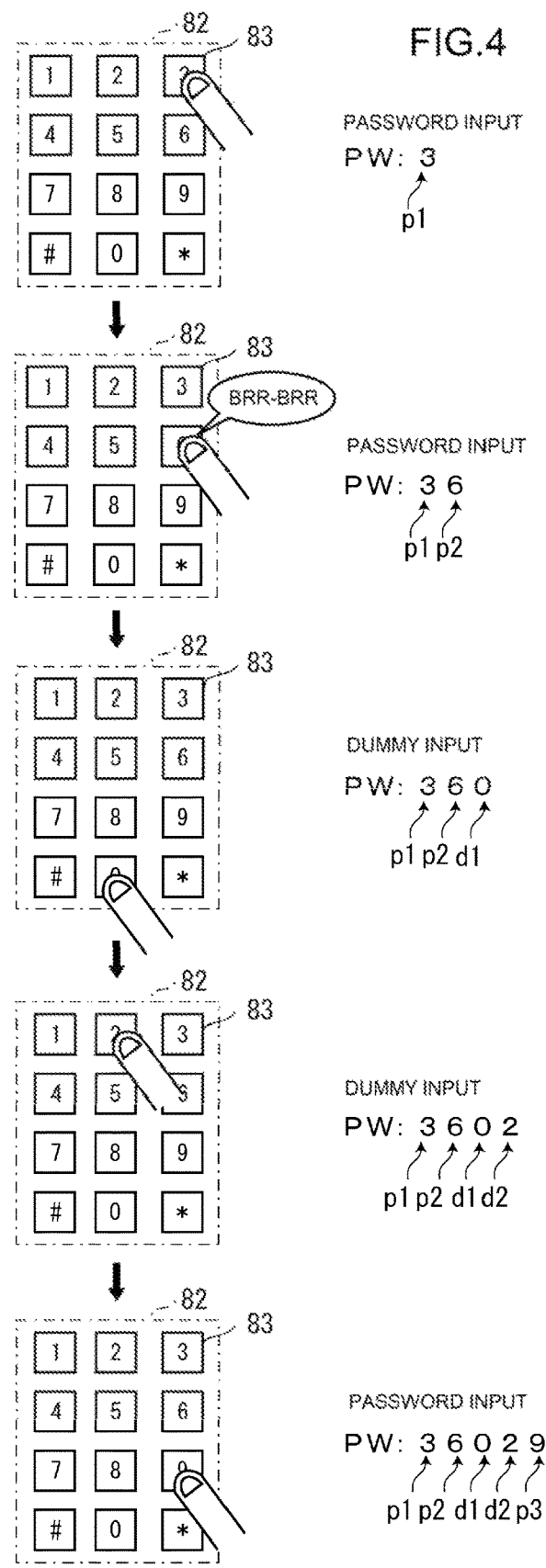
FIG. 4 is an image of the operating procedure of the password-entry screen that is illustrated in FIG. 2.

More specifically, referring to FIG. 4, the operating procedure will be explained for the case in which "369" is entered as the entered password, α that is the dummy key input timing is 2, and the number of times input is required is 2.

First, when "3" is entered by the person entering the password, the input-receiving unit 131 receives "3" as the 1st character p1 of the entered password. The 1st character does not match the input timing (α=2), so the dummy-input-notification unit 132 does not perform notification of the input timing for the dummy keys and the number of times input is required. Next, when "6" is entered by the person entering the password, the input-receiving unit 131 receives "6" as the 2nd character p2 of the entered password. The character is the 2nd character, so matches the input timing (α=2), and the dummy-input-notification unit 132 in order to perform notification of the input timing for the dummy keys and the number of times input is required, drives and controls the piezoelectric elements 112, causing the operation surface of the touch panel 11 to vibrate two times "brr-brr".

Notification by the dummy-input-notification unit 132 is executed according to a simple method of determining whether or not the number of entered characters of the entered password has reached the input timing (αth character), so is executed at nearly the same time as entering the 2nd character of the entered password by the person entering the password. Therefore, the operation surface of the touch panel 11 vibrates before the finger of the person entering the password is removed from the operation surface, and it is possible for the person entering the password to detect that the operation surface vibrated two times.

The operation surface vibrates two times, so the person entering the password uses suitable operation keys 83 to enter a dummy key two times. As a result, the input-receiving unit 131 receives "0" as the input for the first time a dummy key is entered, and receives "2" as the input for the second time a dummy key is entered.

Continuing, the input-receiving unit 131 has received dummy keys for the number of times input is required, so when the person entering the password enters "9" as the remaining entered password, the input-receiving unit 131 receives "9" as the 3rd character p3 of the entered password. As a result, the authenticating apparatus 1, by an easy method of causing the operation screen to vibrate while the entered password is being entered, is able to notify the person that is entering the password of the dummy key input timing and the number of times that input is required, and is able to hide the entered password using dummy keys. Moreover, by entering the entered password with dummy keys mixed in, the entered password can be entered without a third party being able to learn the entered password even when seeing the input order of operation keys 83. The dummy-key-notification unit 132 may also perform notification of dummy key input timing and number of times input is required multiple times while the entered password is being entered.

Returning to FIG. 3, when the OK button B84 is operated to instruct the execution of authentication (step S17: YES), the authentication-processing unit 133 respectively performs comparison of the entered password that is received by the input-receiving unit 131, and the number of times dummy keys are inputted (step S18). As a result, the entered password is compared with the set password, and the number of times dummy keys are inputted is compared with the number of times input is required.

Continuing, the authentication-processing unit 133 determines whether or not the comparison result is a match for both the entered password and the number of times input is required (step S19). When there is a match for both the entered password and the number of times input is required (step S19: YES), in other words, when the entered password and the set password 121 match, and the number of times dummy keys are inputted and the number of times input is required match, the authentication-processing unit 133 determines that authentication succeeded (step S20), and for example, login processing that corresponds to the person entering the password is executed and this process ends.

However, when there is no match for both the entered password and the number of times dummy keys are inputted (step S19: NO), or in other words, when the entered password and the set password 121 do not match, or the number of times dummy keys are inputted and the number of times input is required do not match, when there is no match for at least one of these, the authentication-processing unit 133 determines that authentication is failure (step S21). Next, the authentication-processing unit 133 does not change the input timing or number of times input is required and returns processing to step S13 for receiving the entered password, then prompts the user to re-enter the entered password and dummy keys.

In this way, neither the input timing nor the number of times input is required changes from the previous time, so it is easy for the person entering the password to correctly input dummy keys. Even when the input timing and the number of times input is required are the same as the previous time, the operation keys 83 that are used for entering dummy keys may differ from the previous time, so is effective for hiding the entered password from a third party.

When it is determined that authentication is failure (step S21), the authentication-processing unit 133 may return to the processing of step S12 instead of step S13, and cause the dummy-input-notification unit 132 to change both the input timing for the dummy keys and the number of times input is required. By doing so, it is possible to further increase the security effect.

When it is determined that authentication is failure (step S21), the authentication-processing unit 133 causes the dummy-input-notification unit 132 to change the number of times input is required without changing the input timing of the dummy keys. After that, the authentication-processing unit 133 may advance to the processing of step S13 for receiving the entered password, and give a prompt for re-entering the entered password and dummy keys. In re-entry of the entered password and the dummy keys, the person entering the password performs re-entry while paying attention to the input timing of the dummy keys, so by making the input timing the same as the previous time, it becomes easy to correctly recognize the number of times that input is required even when the number of times that input is required is different. In doing so, it is possible to improve the operability of the person entering the password, while increasing the security effect.

In this way, the authenticating apparatus 1 of this embodiment includes an authentication-processing unit 133, an input-receiving unit 131, and a dummy-input-notification unit 132. The authentication-processing unit 133 executes user authentication by comparing an entered password that is entered with a set password 121 that is set beforehand. The input-receiving unit 131 receives dummy keys that are not compared with the set password 121 when entering the entered password. The dummy-input-notification unit 132 performs notification of the input timing for the dummy keys and the number of times input is required by using vibration. The authentication-processing unit 133, together with comparing the entered password with the set password, compares the number of times dummy keys are inputted with the number of times that input is required. Then, when the entered password and the set password 121 match and the number of times dummy keys are inputted and the number of times input is required match, authentication is determined to be successful. When the entered password and the set password 121 do not match, and/or the number of times dummy keys are inputted and the number of times input is required do not match, authentication is determined to be failure. As a result, while entering the entered password, the authenticating apparatus 1 is able to use vibration to notify the person entering the password of the input timing for the dummy keys and the number of times input is required without a third party knowing. Therefore, the authenticating apparatus 1, by using a simple method, is able to increase security when the password is entered so that the password is not known from the input order of operation keys even when a third party watches the input operation of the person entering the password.

In the embodiment described above, the dummy-input-notification unit 132 causes piezoelectric elements 112 to vibrate the operation surface of the touch panel 11 at the dummy key input timing, however, the dummy-input-notification unit 132 may also cause a portable terminal (refer to FIG. 5) 2 such as a portable telephone or smartphone that is held by the person entering the password to vibrate.

Figure 5:
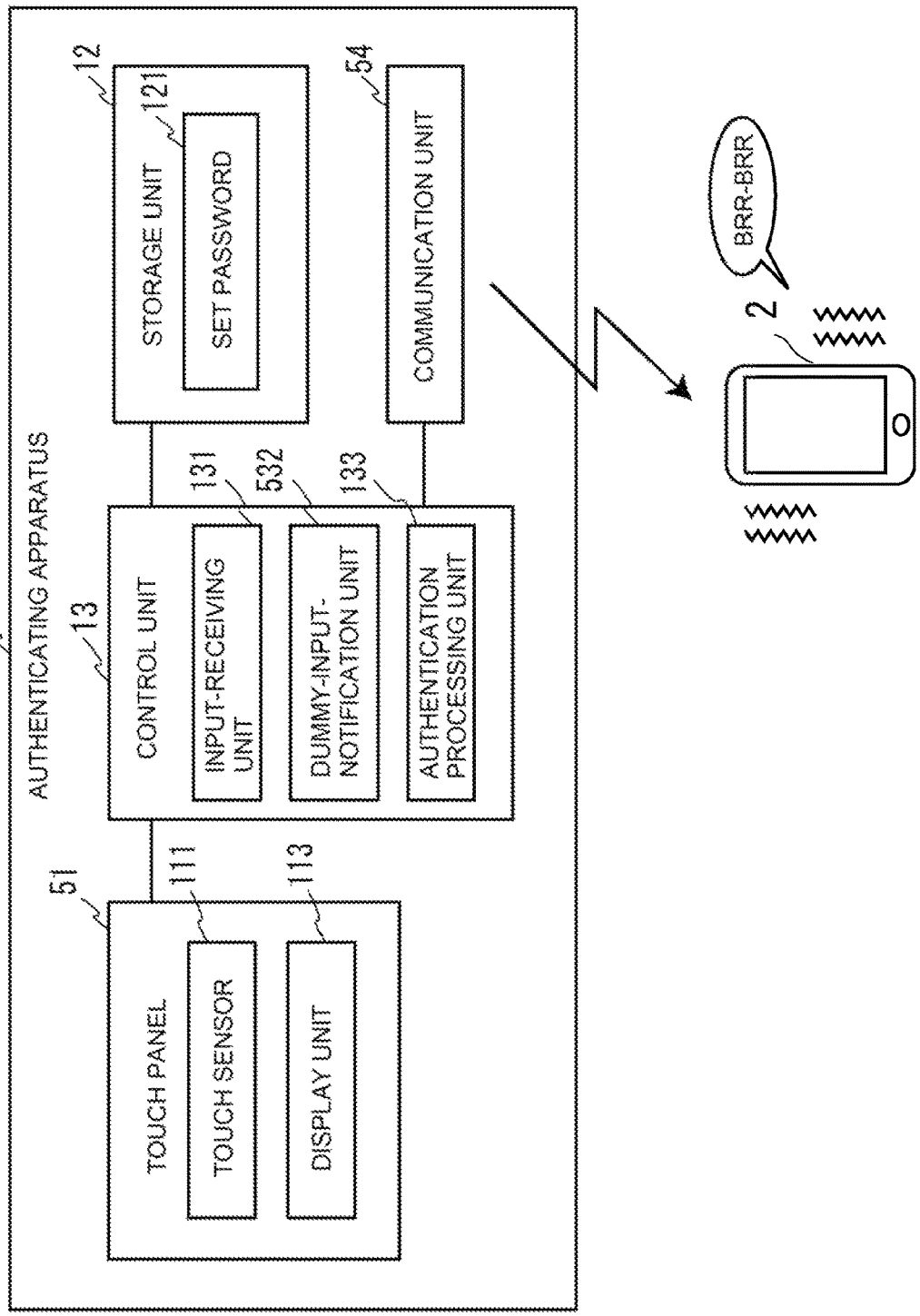
FIG. 5 is a functional block diagram illustrating an overview of the configuration of an authenticating apparatus of another embodiment.

FIG. 5 is a functional block diagram illustrating an overview of the configuration of an authenticating apparatus 5 that causes a portable terminal 2 instead of a touch panel 11 to vibrate. A point of difference between the authenticating apparatus 5 illustrated in FIG. 5 and the authenticating apparatus 1 illustrated in FIG. 1 is that the piezoelectric elements 112 illustrated in FIG. 1 are not provided on the touch panel 51. Moreover, there is a point of difference in that a communication unit 54 for performing wireless communication with the portable terminal 2 is newly provided. Moreover, there is a point of difference in that the dummy-input-notification unit 532 causes the communication unit 54 to vibrate the portable terminal 2 in order to notify of the dummy key input timing and the number of times input is required. The other configuration that is illustrated is the same as in FIG. 1, so an explanation is omitted.

When the dummy-input-notification unit 532 of the authenticating unit 5 determines that the input-receiving unit 131 receives the αth character of the entered password, the dummy-input-notification unit 532, via the communication unit 54 requests the portable terminal 2 that is held by the person entering the password to vibrate in order to perform notification of the dummy key input timing and the number of times input is required. When the portable terminal 2 receives the request from the dummy-input-notification unit 532, the portable terminal 2 functions as a vibration-generating unit and drives a vibration motor of the portable terminal 2, and causes the portable terminal 2 to vibrate the number of times that input is required. As a result, the portable terminal 2 vibrates and notifies the person that is entering the password of the dummy key input timing and the number of times input is required.

By putting the portable terminal 2 in a clothes pocket or by holding the portable terminal 2 by hand, the person entering the password is able to know by vibration of the portable terminal 2 the dummy key input timing and the number of times input is required without a third party knowing. Therefore, the person entering the password is able to enter the entered password with dummy keys mixed in according to an instruction from the dummy-input-notification unit 532 without a third party knowing. It is presumed that the communication unit 54 establishes wireless communication with the portable terminal 2 that is held by the person entering the password beforehand.

Moreover, in this case, the operation keys 83 that are used for entering the entered password and the dummy keys are not limited to software keys and may be hardware keys. Furthermore, the touch panel 51 illustrated in FIG. 5 may also be the touch panel 11 illustrated in FIG. 1 on which piezoelectric elements 112 are provided. In this case, the person entering the password may select whether to receive notification by vibration from the dummy-input-notification unit 532 via the touch panel 11, or to receive notification via the portable terminal 2. Moreover, it is also possible to select notification from both the touch panel 11 and the portable terminal 2. In this case as well, as explained above, the authentication-processing unit 133, does not need to change via the dummy-input-notification unit 532 either or both the input timing and the number of times input is required for re-entering the entered password and dummy keys when it is determined that authentication is failure. Furthermore, it is possible to change both, or it is also possible to change only the number of times input is required.

In typical technology, there is a problem in that when the input operation by a person entering a password is seen by a third party, the password may be known from the order of entering the operation keys, and security when entering the password is weak.

According to the present disclosure, a password is not known from the order of entering operation keys even when the input operation of the person entering the password is seen by a third party, so it is possible by simple method to increase the security when entering a password.

The present disclosure is not limited to the embodiment described above, and needless to say may be modified in various ways within a range that does not depart from the scope of the present disclosure.

What is claimed is:

1. An authenticating apparatus comprising a controller configured to expand a control program into random access memory to function as:

an authentication-processing unit that executes user authentication by comparing an entered password with a preset password;

an input-receiving unit that receives a sequence of characters of the entered password and at least one dummy key inserted before a character in the sequence of characters, wherein the at least one dummy key is not considered part of the sequence of characters such that, in the comparison performed for the user authentication, the at least one dummy key is not compared with the preset password; and a dummy-input-notification unit that causes a notification at an input timing during said receiving of the sequence of characters; wherein the notification comprises at least one vibration;

the input-receiving unit is configured to receive the at least one dummy key after the notification is caused and before receiving the character in the sequence of characters;

the input timing indicates the character in the sequence of characters before which the at least one dummy key is to be inserted;

the number of said at least one vibration indicates the number of dummy keys which are required to be inserted to provide said at least one dummy key; and the authentication-processing unit, together with comparing the entered password with the preset password, compares the number of dummy keys received as said at least one dummy key with the number of dummy keys which are to be inserted, and when the entered password and the preset password match, and the number of dummy keys received as said at least one dummy key match the number of dummy keys which are required to be inserted, determines that authentication is successful, and when the entered password and the preset password do not match, and/or the number of dummy keys received as said at least one dummy key and the number of dummy keys which are required to be inserted do not match, determines that authentication is failure.

2. The authenticating apparatus according to claim 1, wherein
the dummy-input-notification unit
sets the location in the sequence of characters in which the at least one dummy key is to be inserted to a random location within the sequence of characters.

3. The authenticating apparatus according to claim 1, wherein
the dummy-input-notification unit
sets the number of dummy keys which are required to be inserted to a random number.

4. The authenticating apparatus according to claim 1, wherein
when authentication is failure, the authentication-processing unit prompts for re-entry of the entered password and the at least one dummy keys without changing the input timing and number of dummy keys which are required to be inserted.

5. The authenticating apparatus according to claim 1, wherein
when authentication is failure because the number of dummy received as said at least one dummy key and the number of dummy keys which are required to be inserted do not match, the authentication-processing unit causes the dummy-input-notification unit to change both the input timing and the number of dummy keys which are required to be inserted and then prompts for re-entry of the entered password and the at least one dummy key.

6. The authenticating apparatus according to claim 1, wherein
when authentication is failure, the authentication-processing unit causes the dummy-input-notification unit to change the number of dummy keys which are required to be inserted without changing the input timing, and then prompts for re-entry of the entered password and the at least one dummy key.

7. The authenticating apparatus according to claim 1 further comprising
a touch panel that is used to perform an input operation for entering the sequence of characters and the at least one dummy keys; wherein
a vibration-generation unit is provided on the touch panel that causes the touch panel to vibrate; and
the dummy-input-notification unit, via the vibration-generation unit, causes the touch panel to vibrate in order to provide said notification.

8. The authenticating apparatus according to claim 1 further comprising
a communication unit that performs wireless communication with a portable terminal;
wherein
the dummy-input-notification unit,
via the communication unit, requests the portable terminal to vibrate, thereby causing said notification.

* * * * *